United States Patent
Matsuyama et al.

(10) Patent No.: US 6,456,352 B1
(45) Date of Patent: Sep. 24, 2002

(54) LIQUID CRYSTAL DISPLAY DEVICE

(75) Inventors: Hiroaki Matsuyama; Kazumi Kobayashi; Yoshihiko Hirai; Toshiya Ishii; Masayoshi Suzuki; Hideya Murai, all of Tokyo (JP)

(73) Assignee: NEC Corporation, Tokyo (JP)

( * ) Notice: Subject to any disclaimer, the term of this patent is extended or adjusted under 35 U.S.C. 154(b) by 132 days.

(21) Appl. No.: 09/590,285

(22) Filed: Jun. 9, 2000

(30) Foreign Application Priority Data

Jun. 11, 1999 (JP) .......................................... 11-164570

(51) Int. Cl.⁷ ..................... G02F 1/1343; G02F 1/1345
(52) U.S. Cl. ........................................ 349/143; 349/139
(58) Field of Search ................................... 349/143, 144, 349/139, 43, 46, 132

(56) References Cited

U.S. PATENT DOCUMENTS

| | | | | |
|---|---|---|---|---|
| 5,754,266 A | * | 5/1998 | Ohta et al. .................... | 349/139 |
| 5,774,099 A | * | 6/1998 | Iwasaki et al. ................ | 345/87 |
| 6,300,996 B1 | * | 10/2001 | Matsuyama et al. ......... | 349/144 |
| 6,327,013 B1 | * | 12/2001 | Tombling et al. ............ | 349/139 |

FOREIGN PATENT DOCUMENTS

| | | |
|---|---|---|
| JP | 7-13164 | 1/1995 |
| JP | 7-199190 | 8/1995 |
| JP | 7-230097 | 8/1995 |
| JP | 8-76125 | 3/1996 |
| JP | 10-20323 | 1/1998 |

* cited by examiner

*Primary Examiner*—Toan Ton
*Assistant Examiner*—Hoan Nguyen
(74) *Attorney, Agent, or Firm*—Foley & Lardner (57) ABSTRACT

A liquid crystal layer is sandwiched between two substrates of glass or the like and a gate terminal, a gate wiring, a control electrode and a drain terminal are arranged on the liquid crystal layer. The liquid crystal display device further has a control electrode terminal of the control electrode which is in an independent condition without crossing the gate wiring. A terminal part including this control electrode terminal and the gate terminal as well as the drain terminal is arranged on the outer side of the substrate panel. According to this construction, an arbitrary voltage can be applied to the control electrode so that the diagonal electrical field, which is necessary for the orientation division, can be set optimum in the intensity. Thereby the orientation division can be carried out properly. In addition, since there is no overlapping between the control electrode, including wiring and terminals, and the gate wiring, the short circuit problem can be alleviated to create good manufacturing yield of the liquid crystal display device.

8 Claims, 6 Drawing Sheets

LIQUID CRYSTAL DISPLAY DEVICE

BACKGROUND OF THE INVENTION

1. Field of the Invention

The present invention relates to a liquid crystal display device, in particular, to an orientation division type liquid crystal display device of which the manufacturing process is simplified.

2. Description of the Related Art

Conventional liquid crystal display devices are widely known in which a twisted nematic system or a vertical orientation system are adopted. However, liquid crystal display devices of those systems have the problem that the tint differs according to the viewing angle, since the orientation direction of the liquid crystal molecules of the intermediate layer of the liquid crystal layer at the time of voltage application is uniform within pixels and, therefore as a method to improve this viewing angle characteristic, an orientation division type liquid crystal display device is introduced. Here, the orientation division type liquid crystal display device is a technology for gaining broad sight angle characteristics by dividing one pixel into a plurality of regions and by making the orientation direction of the liquid crystal molecules of the intermediate layer in each region different, so that the visual characteristic of each region compensate for each other.

Figure 1:
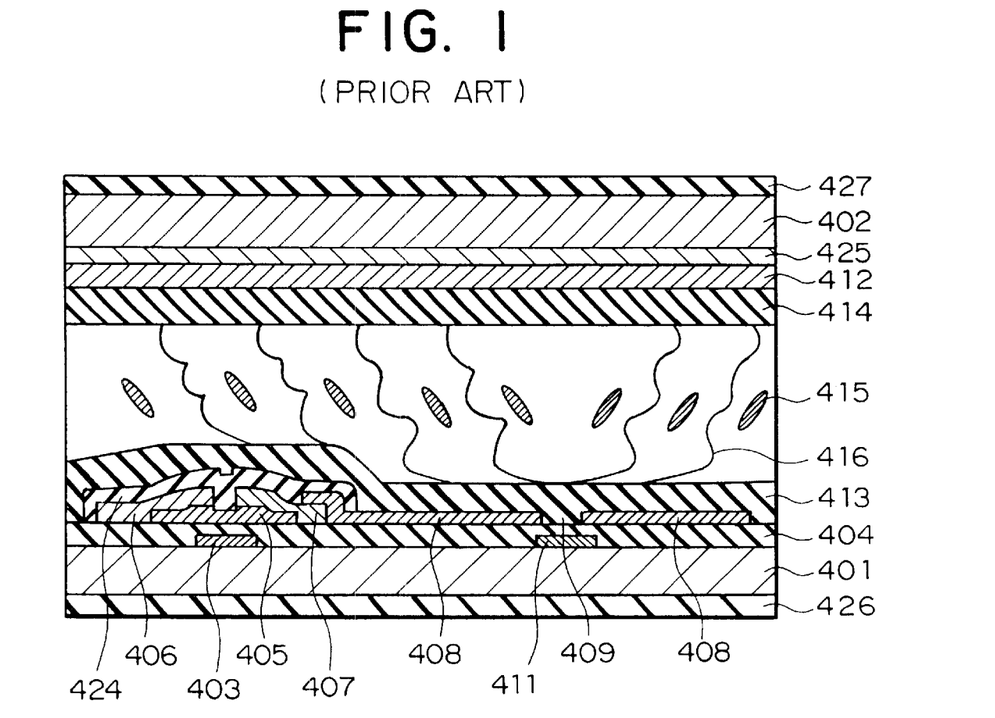
FIG. 1 is a cross section view showing the structure of a liquid crystal display device of a conventional example 1.
Figure 2:
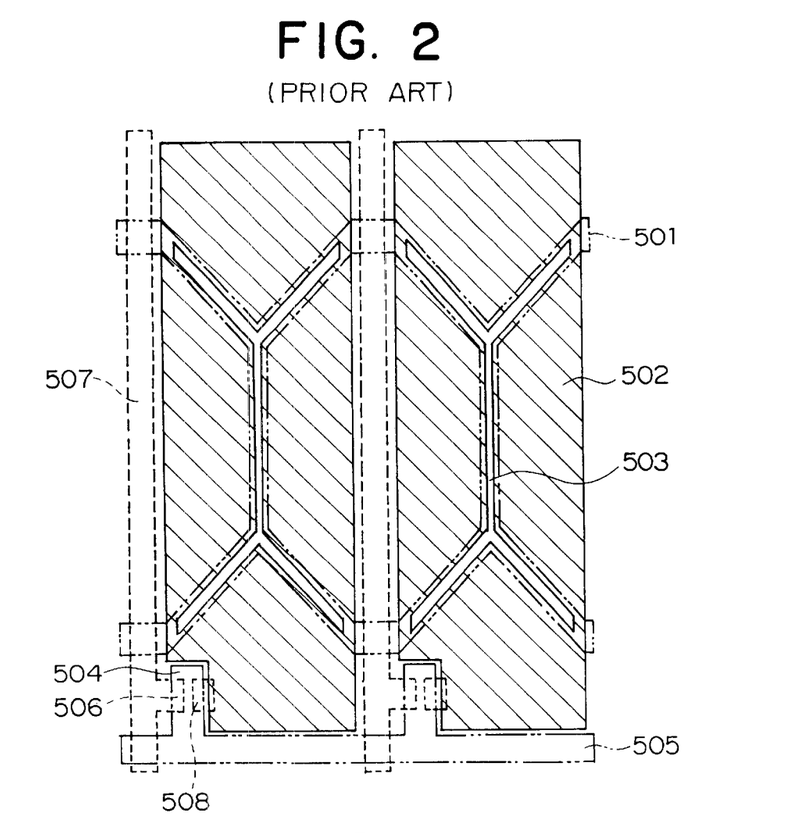
FIG. 2 is a plan view showing the structure of a liquid crystal display device of a conventional example 1.

FIG. 1 is a sectional view showing an orientation division type liquid crystal display device according to a prior art (conventional example 1: for example Japanese Laid-open Patent publication No. Hei-10-20323) and FIG. 2 is a plan view of the same.

As shown in FIG. 1, a switching element comprises a gate electrode 403, a gate insulation film 404, a semiconductor layer 405, a drain electrode 406 and a source electrode 407. The switching element and a pixel electrode 408 which is electrically connected to the source electrode 407 are arranged on a substrate 401. An opening 409 is provided to the pixel electrode 408 which becomes the border of the regions for orientation division. Under the opening 409, a control electrode 411 is provided. The numeral 424 shows a passivation film and the 425 shows a color layer. Also, the numerals 426 and 427 show optical films.

On the opposite substrate 402, a common electrode 412 is provided. This common electrode 412 doesn't need an opening. Orientation films 413 and 414 are formed on the respective substrate 401 and 402, as the top layers of the respective substrates, and the orientation films 413 and 414 sandwich liquid crystal molecules 415. By applying a voltage onto the control electrode 411, a diagonal electric field is generated across the edge of the opening 409 and the edge of pixel electrode 408. The orientation direction of the liquid crystal molecules 415 is divided by the diagonal electric field of which the direction of the generation differs with the border of the opening 409.

The orientation direction of the liquid crystal molecules as shown in FIG. 1 exhibits the orientation direction of the liquid crystal molecules 415 existing mainly in the central layer of the liquid crystal molecule layer. At this time by carrying out ultraviolet irradiation, a small amount of ultraviolet curing monomer or oligomer, which has been added to the liquid crystal molecules 415 in advance, is polymerized to become a polymer 416.

The polymer 416 follows the orientation direction of the liquid crystal molecules 415 at the time of ultraviolet irradiation so as to secure its form even in the case when no voltage is applied to the control electrode 411. In addition, since the polymer 416 is small in quantity, the liquid crystal molecules 415 are regulated only in the rising direction at the time of voltage application while the gradient changes according to the applied voltage. Accordingly, it is not necessary to apply a voltage to the control electrode 411 at the time of driving and the display can be made performed by only applying voltage to the pixel electrode 408, with the result in that application only to the pixel electrode 408 makes display possible.

In the plan view as shown in FIG. 2, an example is disclosed in which the structure is formed in a Y shape configured by the opening 503 and the control electrode 501 arranged side by side. When carrying out a predetermined rubbing and when performing the process of the above described orientation division, a TN orientation divided into four pieces is formed by this configuration.

In an example with respect to the control electrode in this disclosed technology there are descriptions in which the control electrode is formed in the same layer as the gate electrode, in which a different voltage from that of the pixel part can be applied to from the outside, and in which a voltage is applied to the control electrode at the time when the device is manufactured. However, there are no descriptions with respect to its wiring method and how to draw out terminals.

Technologies where the control electrode is added in order to carry out an orientation control of the liquid crystal molecules such as the technology described in the Japanese Laid-open Patent publication No. Hei-10-20323 of the conventional example 1 are also disclosed in the Japanese Laid-open Patent publication No. Hei-7-13164, the Japanese Laid-open Patent publication No. Hei-7-199190, the Japanese Laid-open Patent publication No. Hei-7-230097 and the Japanese Laid-open Patent publication No. Hei-8-76125. The particular points of difference between these technologies and the technology of conventional example 1 is that a predetermined voltage is applied not at the time when the device is manufactured but at the time the display is driven.

Figure 3:
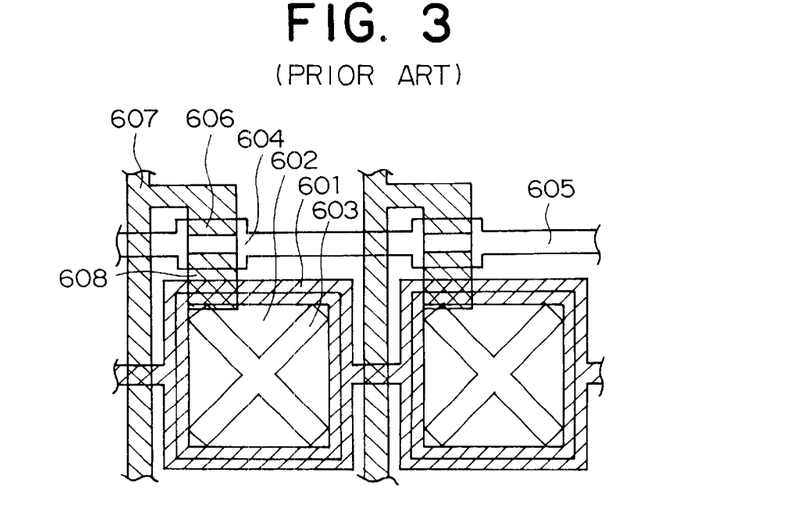
FIG. 3 is a cross sectional view of a liquid crystal display device of a conventional example 2.

FIG. 3 is a plan view showing a technology disclosed in the Japanese Laid-open Patent publication No. Hei-7-199190 (conventional example 2).

Referring to FIG. 3, the control electrode 601 (referred to as an orientation control electrode in the above described publication) has a structure which surrounds the periphery of the pixel electrode 602 so as to control the orientation direction of the liquid crystal molecules by generating a specific diagonal electrical field between each edge of the pixel electrode 602 and the control electrode 601. There are mainly two types of settings with respect to the positional relationships of each electrode and an applied voltage. The first setting is an electrode arrangement where the control electrode is arranged as the lower layer of the pixel electrode and an X type opening 603 is arranged in the common electrode on the opposite substrate. In this structure, the control electrode is connected in parallel to the input terminal of the common electrode and is set to be at the same potential as the common electrode. The second setting is an example where the X type electrode opening 603 is arranged in the pixel electrode 602 so that the control electrode 601 is arranged as a layer above the pixel electrode.

Regarding the applied voltage settings in this structure, there is a description in which the effective potential difference between the control electrode and the common electrode is set to be larger than the effective potential difference between the display electrode and the common electrode without any description relating to its wiring or the way the terminal are drawn out. That is to say, there is no description with respect to the connection structure in the case where a different potential independent of the pixel electrode or the common electrode is applied to the control electrode. With respect to this point the situation is the same as that in the Japanese Laid-open Patent publication No.Hei-7-13164 and the Japanese Laid-open Patent publication No.Hei-8-76125.

Figure 4:
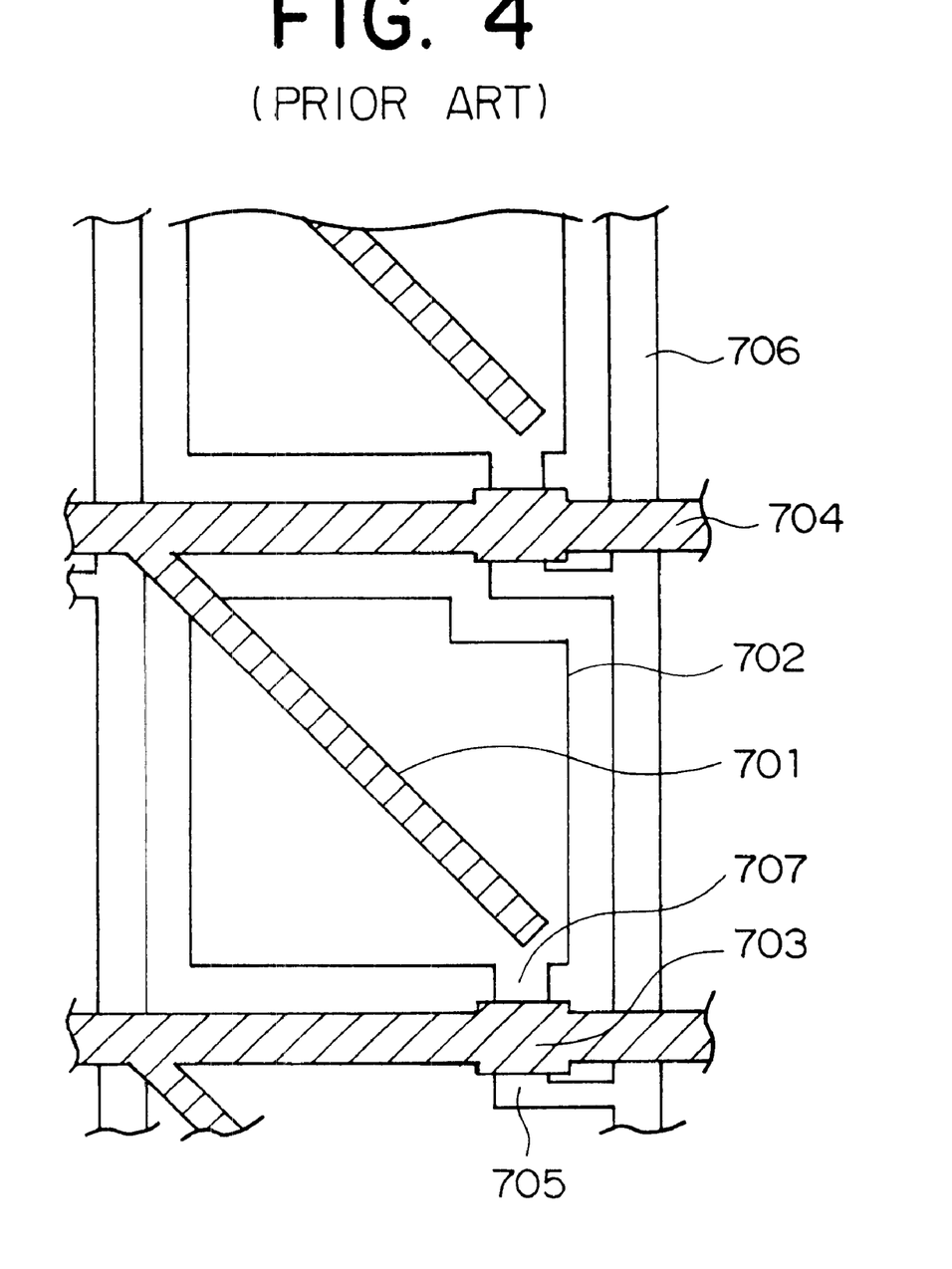
FIG. 4 is a cross section view of a liquid crystal display device of a conventional example 3.

Next, referring to FIG. 4, a technology described in the Japanese Laid-open Patent publication No.Hiei-7-230097 (conventional example 3) is explained. Referring to FIG. 4 the control electrode 701 arranged in each pixel is connected to the gate wiring 704. By this structure, the same potential as that of the gate wiring 704 and the gate electrode 703 is applied to the control electrode 701 in the configuration.

As described above, with respect to a liquid crystal display device where a voltage is applied to the control electrode at the time when the display is driven, a structure is disclosed where a voltage is applied by connecting the control electrode to the common electrode or the gate electrode.

In the case of each of the above described conventional examples, however, the potential of the control electrode becomes a potential specified as the same potential as the common electrode or the gate electrode. Therefore, it is difficult to set the diagonal electrical field for controlling the orientation direction of the liquid crystal molecules to the optimal dimension. It is also necessary to construct the control electrode which enables this optimal diagonal electrical field to be set easily.

SUMMARY OF THE INVENTION

The object of the present invention is to provide an orientation division type liquid crystal display device of which the manufacturing method is simplified.

A liquid crystal display device according to the present invention comprises two substrates of glass or the like, a liquid crystal layer sandwiched between said substrates and a gate terminal (105), a gate wiring (104), a control electrode (101) and a drain terminal (107) are arranged on the liquid crystal layer. The liquid crystal display device further comprise a control electrode terminal of the control electrode in a condition independent of the gate wiring so that the configuration is characterized in that the terminal part including this control electrode terminal, the gate terminal and the drain terminal is arranged on the outer side of the substrate panel.

In the liquid crystal display device, the control electrode terminal may be arranged so as to be extended to the terminal part where the drain terminal exists after each control electrode is connected to one line on the external side which is the opposite side to the side where the gate terminal (105) is arranged and which does not cross the gate wiring (104). The terminal part may be arranged onto the two outer sides of the substrate panel.

The control electrode terminal may be provided for each row on the outer side of the substrate panel which is a different side from where the gate terminal is arranged.

The control electrode terminal may be provided to the layer which is the same as, or different from, the layer where the gate wiring and/or the gate terminal are arranged.

The control electrode may have a lattice type structure including a structure where two Y shapes are combined.

A voltage independent from other terminals including the gate terminal and drain terminal, may be applied to the control electrode terminal at the time when the liquid crystal display device is manufactured and/or at the time of driving so that it becomes possible to regulate the rising direction of liquid crystal molecules in the liquid crystal layer.

In the above described liquid crystal display devices according to the invention, the control electrode terminal of each control electrode is arranged on the outer side which does not cross the gate wiring and the terminal parts, including the gate terminal, the drain terminal and the control electrode terminal are arranged on the outer side of the substrate panel.

In this configuration, an arbitrary voltage can be applied to the control electrode so that the diagonal electrical field which is necessary for orientation division can be set to optimal intensity. Therefore, the orientation division can be carried out properly. In addition, since there is no overlapping between the control electrode (including wiring and terminals) and the gate wiring, the short circuit problem can be improved so as to create good manufacturing yield of the liquid crystal display device. Moreover, the terminal parts can be composed of two sides of the panel allowing a minimized area of the non-display part, despite the drawing out of more terminals than in the general liquid crystal display device. Therefore, the panel's outer shape can be made small. In addition, it becomes possible to arrange the gate terminal and control electrode terminal on the same side so that it becomes unnecessary to be arranged with division in the case when using a driver which has the output for the gate electrode and the output for the control electrode together. Therefore, the number of drivers can be made smaller so as to reduce the process steps for attaching the driver.

DETAILED DESCRIPTION OF THE PREFERRED EMBODIMENTS

In the following, the preferred embodiments of the present invention are concretely described with reference to the attached drawings.

Figure 5:
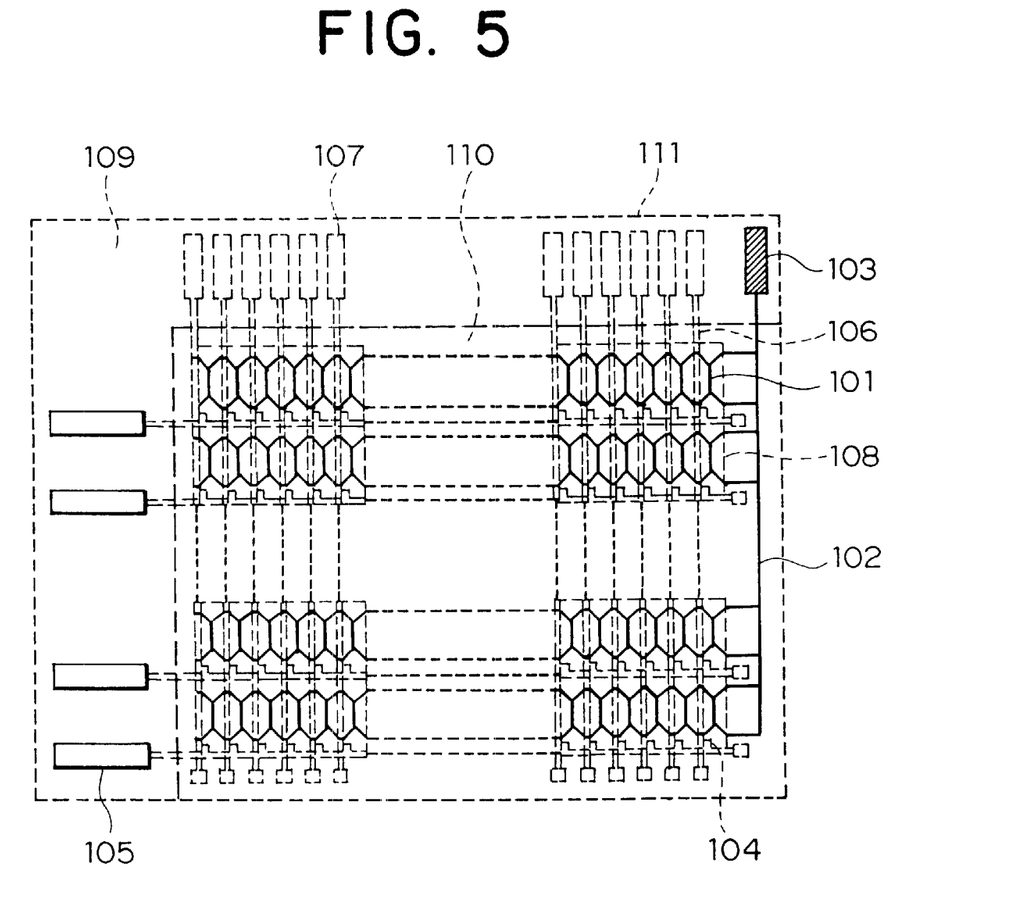
FIG. 5 is a plan view showing a liquid crystal display device according to the first embodiment of the invention, which shows a wiring structure example in the case that each control electrode arranged in the entire pixel is maintained at the same potential.
Figure 6:
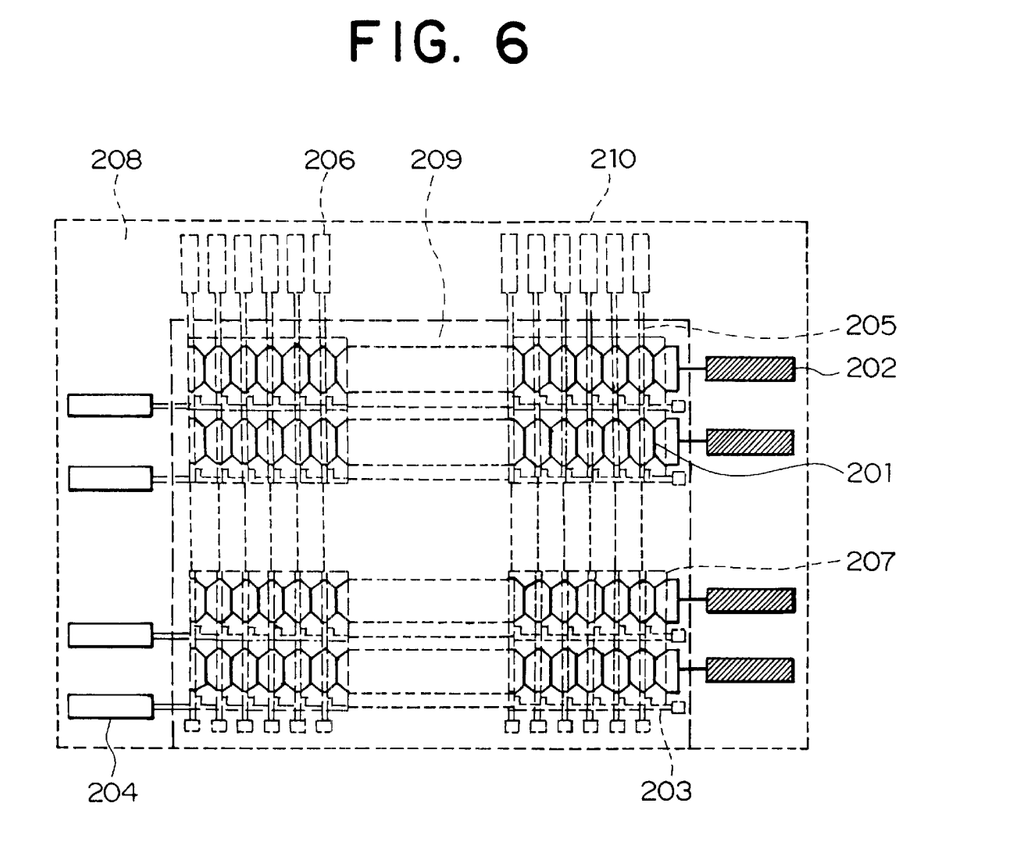
FIG. 6 is a plan view showing a liquid crystal display device according the second embodiment of the present invention which shows a structure example corresponding to the case where an independent potential is applied for each row of the pixels arranged in a matrix.
Figure 7:
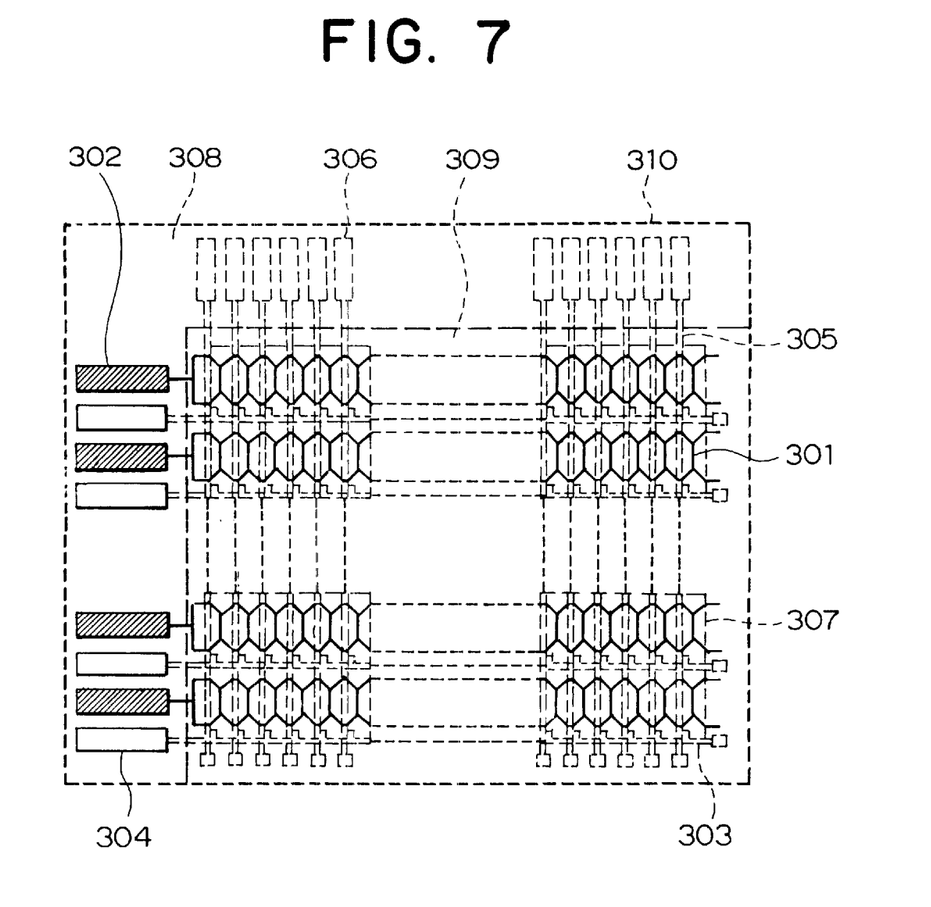
FIG. 7 is a plan view of a liquid crystal display device according to the third embodiment of the invention, which shows a structure example corresponding to the case where an independent potential is applied for each row of the pixels arranged in a matrix.

Next, a liquid crystal display device according to an embodiment of the present invention is described with reference to the attached drawings. FIGS. 5, 6 and 7 are plan views showing a liquid crystal display device according to an embodiment of the present invention.

In the liquid crystal display device of the present embodiment, the contents below comprise the technology already disclosed with respect to the wiring structure and the potential setting of the control electrode: "the control electrode (wiring) is connected in parallel with the common electrode on the opposite substrate and maintained at the same potential as the common electrode" or "the control electrode is connected to the gate wiring and is maintained at the same potential as the gate wiring." The content described below, however, is a technology disclosed for the first time in the present invention, and is the characteristic of the present invention: "a wiring structure in the case when an independent potential is set for the control electrode, in particular a drawn out terminal structure."

The structure of FIGS. 5, 6 and 7 can correspond to the case where the layer forming the gate wiring and the layer forming the control electrode are, in particular, the same layer (formed simultaneously) since the control electrode (including the wiring and the terminals) and the gate wiring don't cross.

FIG. 5 is a plan view showing a liquid crystal display device according to the first embodiment of the present invention. The present embodiment shows an example of a wiring structure in the case when each of the control electrodes 101, arranged for all pixels, are maintained at the same potential. The wiring structure of the liquid crystal display device of the present embodiment comprises a control electrode 101, a control electrode connection part 102, a control electrode terminal 103, a gate wiring 104, a gate terminal 105, a drain wiring 106, a drain terminal 107, a pixel electrode 108, a terminal part 109, a display part 110 and a panel frame 111.

This wiring structure is optimal in the case when the same potential is applied to the control electrodes of all of the pixels in the process of orientation division prior to display driving like the technology described in the Japanese Laid-open Patent publication No.Hei-10-20323 of the conventional example 1. Each control electrode is connected to one line on the outer side, which is the opposite side to the side where the gate terminal 105 is arranged and which does not cross with the gate wiring 104, of which the structure is characterized by the arrangement of the control electrode terminal 103, where the line is extended to the terminal part where the drain terminal 107 exists. The terminal part 109 is arranged on the two sides of the outer side of the panel.

Next, the configuration of the liquid crystal display device according to the first embodiment of the present invention as shown in FIG. 5 is further described with reference to the plan view shown in FIG. 2 and a cross section view shown in FIG. 1 which are used to explain the prior art. In the present first embodiment, the technology is equivalent to that described in the Japanese Laid-open Patent publication No.Hei-10-20323 of the conventional example 1 except for the structure with respect to the wiring connection and the drawn out terminals of the control electrode.

On a transparent substrate 401 such as glass or the like a gate electrode 403 (504) formed of a single-layer or multi-layer of metals such as Cr or ITO, a gate wiring 104 (505), a gate terminal 105, a control electrode 101 (411, 501), a control electrode connection part 102 and a control electrode terminal 103 are formed by sputtering and a photo-resist process. As the top layer a gate insulation film 404 formed of two layers of silicon nitride and silicon oxide is formed by CVD (chemical vapor deposition). In addition, a semiconductor layer 405 formed of amorphous silicon (a-Si, n⁺a-Si) is formed as the top layer in the processes of CVD and photo-resist followed by a drain electrode 406 (506), a source electrode 407 (508), a drain wiring 106 (507) and a drain terminal 107 formed of a single-layer or multi-layer of metal such as Cr or ITO formed by the sputtering and a photo-resist process. By the processes so far a gate wiring and a drain wiring as well as switching elements located at the respective intersection points are formed.

Next, a pixel electrode 108 (408, 502) formed of a transparent conductive film such as ITO is formed by sputtering and a photo-resist process. At this an opening 409 (503) is formed so that the control electrode exists as the lower layer arranged below this opening. As the top layer, a passivation film 424 formed of silicon nitride is formed by CVD and a photo-resist process. The terminal of each electrode should be conductive on the uppermost surface on the substrate, therefore, the insulation film used as the top layer has been eliminated by proper etching.

Next, the structure relating to the substrate arranged on the opposite side is described. On the transparent substrate 402 such as glass or the like a color layer 425 for color displaying is formed. As the top layer, a transparent conductive film, here the common electrode 412 formed of ITO, is formed by sputtering.

The orientation film 413, 414 are formed, as the uppermost layers of the substrate 401 and the substrate 402, of organic films such as polyimide followed by an orientation processing. Here the polyimide JALS-428 (trade name of JSR Corporation) is used and rubbing is carried out. Next, the substrates 401 and 402, of which the surfaces of the orientation film sides are facing each other, are arranged in parallel maintaining a constant gap so that liquid crystal material is filled into the space between them. The liquid crystal material is made of liquid crystal molecules 415 and a small amount of ultraviolet curing monomer or oligomer. In this case, as the liquid crystal material, for example, ZLI-4792 (trade name of Merck Corporation) of which the dielectric constant anisotropy is positive and to which the ultraviolet curing monomer KAYARAD PET-30 (trade name of Nihon Kayaku Corporation) is added by 1.0 wt % of ZLI-4792 is utilized. At this time a starting agent (for example, Iluganox 907 (trade name) in the amount of 5 wt % of monomer) may be added.

Next, a process for carrying out orientation division is described. As shown in FIG. 5, uniform voltage can be applied to the control electrodes arranged for all of the pixels by applying a voltage onto the control electrode terminal 103. More concretely, respective voltages are applied to respective terminals so that the control electrode becomes several tens of volts and the common electrode, the gate wiring and the drain wiring become "0" volts. Diagonal electrical fields occur, in different directions, along the border of the opening which regulate the orientation direction of the liquid crystal molecules 415 so that the orientation is divided as shown in FIG. 1. At this time, by carrying out ultraviolet irradiation from the substrate 401 side, the ultraviolet curing monomer or oligomer is polymerized to become a polymer 416. This polymer 416 is based on the orientation direction of the liquid crystal molecules at the time of ultraviolet irradiation and takes form even in the case that no voltage is applied to the control electrode. Since the polymer 416 is a small amount, the liquid crystal molecules, of which the gradient varies in accordance with the applied voltage, are regulated only in the rising direction at the time of voltage application. Accordingly, voltage need not be applied to the control electrode at the time of driving and display becomes possible only by the voltage application to the pixel electrode.

Optical films 426, 427 are attached to the outer surfaces of the substrates 401 and 402. The optical films are formed of deflection plates or deflection plates and optical compensation films. At this time, the absorption axes of the deflection plates attached to respective substrates are arranged to cross at right angles. Here, each of them is arranged so as to cross at right angles in the rubbing direction of each substrate.

In the liquid crystal display device of the present invention, it becomes possible to set an arbitrary voltage for the control electrode so that the orientation division can be carried out properly. The gate wiring and the control electrode, or the control electrode connection parts, don't cross and, therefore, defects due to a short circuit can be controlled. In addition, the control electrode terminal is arranged at the same terminal part as the drain terminal, therefore, it is possible for the panel frame to be suppressed to a minimum.

Though, in the present embodiment, the orientation division of the TN orientation system is carried out, it is possible to apply the orientation division of vertical orientation system by using a liquid crystal material, of which the dielectric constant anisotropy is negative, as the liquid crystal material (for example, MLC-6608 made by the Merck Corporation) and a vertical orientation film as the orientation film (for example, JALS-682 made by the JSR Corporation). In addition, though the control electrode is formed in the same layer as the gate wiring or the gate electrodes, the same effects can be gained even if it is formed in a different layer (upper layer or lower layer) from the gate wiring or the gate electrode.

FIG. 6 is a plan view showing a liquid crystal display device according to the second embodiment of the present invention. The present embodiment exhibits a structure corresponding to the case where independent potentials are applied to respective rows of the pixels arranged in a matrix. In the case that the polarities of the pixel electrode for each row are reversed, such as in the gate line reverse driving system, it becomes possible to reverse the polarities of the control electrode of each row so as to correspond to that. The arrangement of the respective control electrode terminals 202 is characterized by the wiring of the control electrode 201 which is extended to the side on the opposite side to the side where the gate terminal 204 is arranged. The terminal part 208 is arranged on three sides of the panel.

The second embodiment of this invention is further described in reference to a plan view shown in FIG. 6. This is the same as the first embodiment except for the connection and the terminal drawn out structure of the control electrode, the fixing of the orientation of the liquid crystal molecules by ultraviolet curing monomer or oligomer (here, no ultraviolet curing monomer or oligomer is added to the liquid crystal, but the fixing of the orientation may be carried out such as in the above described first embodiment) and methods with respect to voltage application.

Referring to FIG. 6, the control electrode terminal 202, which is provided with a terminal part, is arranged on the side opposite to the gate terminal 204. A voltage can be set for the control electrodes of each row of the pixels arranged in a matrix. The gate line reversion driving (a driving method for reversing the polarities of the potential of the pixel electrode of each row) is carried out. A gradation display is carried out by applying positive polarity from +1.5V to +5V and negative polarity from –1.5V to –5V to the pixel electrode with respect to the potential of the common electrode. +12V is applied to the control electrode with respect to the common electrode potential when the pixel electrode has positive polarity and –12V is applied to the common electrode potential at the time of negative polarity so as to form the orientation division. An independent potential setting allows for effective orientation division.

The second embodiment, in comparison with the first embodiment, shows the same content except that there is a larger panel frame with terminal parts 208 located on three sides in the second embodiment, with the other effects maintained as is. The driver for the control electrode can correspond with the same terminal pitch as that of the driver for the gate electrode and can suppress the development cost.

FIG. 7 is a plan view showing the third embodiment of the present invention. The present embodiment has a structure corresponding to the case when an independent potential is applied to each row of the pixels arranged in a matrix in the same way as in the case of the second embodiment in FIG. 6. The points that are different from the structure of FIG. 6 is the extension of the wiring of the control electrode 301 to the same side as the side where the gate terminal 304 is arranged and to arrange each control electrode terminal 302 between each pair of gate terminals. The terminal parts 308 are arranged on two sides of the panel. That is to say, the present third embodiment has a different structure of the connection and the drawn out terminal of the control electrode, the other points remain the same as those of the second embodiment.

In the structure of the second embodiment, the panel frame becomes larger with terminal parts 208 on the three sides. Therefore, in this structure, the control electrode terminal 302 is arranged on the terminal part where the gate terminal 304 is arranged.

Here, by arranging the control electrode terminal and the gate terminal alternately, crossing between the control electrode and the gate wiring is nullified so as to have a structure which can be formed in the same layer. At the time of the driving display, in the case when a voltage is applied to the control electrode, a driver is used which has both the gate output and the control electrode output. By using the driver with a narrow terminal pitch, it becomes possible to reduce the number of drivers (the number of connections of the drivers) from the second embodiment. The panel frame 310 can be limited to the minimum size.

The above described embodiments are preferred examples of the present invention. The invention is not limited to those but a variety of modifications are possible within the scope of the invention without deviating from the gist of the invention.

What is claimed is:

1. A liquid crystal display device comprising:
   a first substrate panel and a second substrate panel;
   a liquid crystal layer held between said first and second substrate panels;
   a gate terminal, a gate wiring, a plurality of control electrodes, a drain terminal, and a drain wiring, being disposed on said first substrate panel;
   a control electrode terminal in a condition independent of said gate wiring;
   a terminal part including said control electrode terminal, said gate terminal and said drain terminal, said terminal part being arranged on at least first and second side portions of a surface of said first substrate panel; and wherein said control electrode terminal is disposed on said first side portion of said terminal part with the gate terminal being disposed on said second side portion of the terminal part, and wherein each of said control electrodes is connected into a connected line that does not cross with the gate wiring, said connected line being arranged so as to extend to the second side portion of said terminal part.

2. A liquid crystal display device according to claim 1, wherein said control electrode terminal is provided in a layer which is the same as the layer where the gate wiring and/or the gate terminal are arranged.

3. A liquid crystal display device according to claim 1, wherein said control electrodes have a lattice type structure including a structure formed by combining two Y shapes.

4. A liquid crystal display device according to claim 1, wherein a voltage independent from other terminals including the gate terminal and-the drain terminal is applied to said control electrode terminal at the time of manufacture of said liquid crystal display device and/or at the time of driving so that it becomes possible to regulate the rising direction of the liquid crystal molecules of said liquid crystal layer.

5. A liquid crystal display device comprising:

a first substrate panel and a second substrate panel;

a liquid crystal layer held between said substrate panels;

a gate terminal, a gate wiring, a plurality of control electrodes, and a drain terminal being disposed on said first substrate panel;

a terminal part including a plurality of control electrode terminals, said gate terminal, and said drain terminal, said terminal part being arranged on at least first and second side portions of a surface of said first substrate panel; and wherein a separate control electrode terminal, in a condition independent of said gate wiring, is provided for each of a plurality of rows of said control electrodes on said first side portion of the terminal part, and wherein the gate terminal is arranged on either said first side portion or said second side portion of the terminal part.

6. A liquid crystal display device according to claim 5, wherein said control electrode terminals are provided in a layer which is the same as the layer where the gate wiring and/or the gate terminal are arranged.

7. A liquid crystal display device according to claim 5, wherein said control electrodes have a lattice type structure including a structure formed by combining two Y shapes.

8. A liquid crystal display device according to claim 5, wherein a voltage independent from other terminals including the gate terminal and the drain terminal is applied to said control electrode terminals at the time of manufacture of said liquid crystal display device and/or at the time of driving so that it becomes possible to regulate the rising direction of the liquid crystal molecules of said liquid crystal layer.

* * * * *